E. J. LEE AND E. H. STEINMETZ.
BRAKE BAND.
APPLICATION FILED MAR. 2, 1918.

1,302,680.

Patented May 6, 1919.

WITNESSES

INVENTORS
ELMER J. LEE,
EDWIN H. STEINMETZ,
BY

ATTORNEYS

UNITED STATES PATENT OFFICE.

ELMER JESSE LEE AND EDWIN HARRISON STEINMETZ, OF BANGOR, PENNSYLVANIA.

BRAKE-BAND.

1,302,680.  Specification of Letters Patent.  Patented May 6, 1919.

Application filed March 2, 1918. Serial No. 220,097.

*To all whom it may concern:*

Be it known that we, ELMER J. LEE and EDWIN H. STEINMETZ, citizens of the United States, and residents of Bangor, in the county of Northampton and State of Pennsylvania, have made certain new and useful Improvements in Brake-Bands, of which the following is a specification.

Our invention relates to improvements in brake bands, more particularly to emergency brake bands of Ford automobiles, and it consists in the combinations, arrangements and constructions of parts herein described and claimed.

An object of our invention is to provide a device which will insure the uniform expansion of both ends of the brake band when the latter are actuated by the cam, so that both ends of the brake band will engage the drum.

A further object of our invention is to provide a brake band which may be readily formed from existing brake bands by the addition of two simple guide members.

A further object of our invention is to provide means for expanding the ends of the brake band uniformly without detracting from the efficiency of the brake band as a whole.

Other objects and advantages will appear in the following specification and the novel features of the invention will be particularly pointed out in the appended claims.

Our invention is illustrated in the accompanying drawing forming part of this application, in which:—

Figure 1:
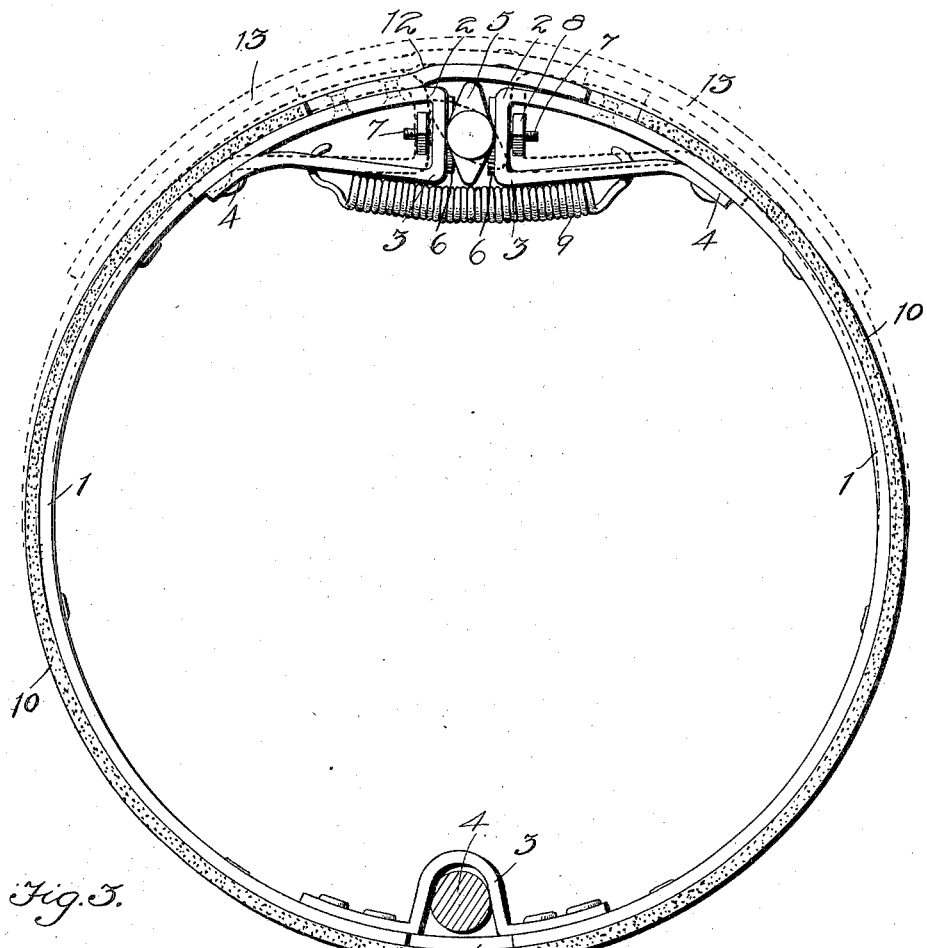
Figure 1 is a side view of a brake band constructed according to our invention.

In carrying out our invention, we make use of a spring metal body portion 1, which is partly cut away at 2 to permit bending, and which is provided with a bracket or bearing member 3, arranged to fit over a stud 4. The band is bent inwardly at 2, at each end, and thence outwardly at 3, being secured to the inner side of the band at 4. The cam 5 bears on washers 6, which are secured to screw bolts 7, which pass through the opposed portions of the band, nuts 8 being provided to hold the screw bolts in position. A spring 9 connects the opposed end portions of the brake band so as to hold them normally in engagement with the cam 5.

Figure 3:
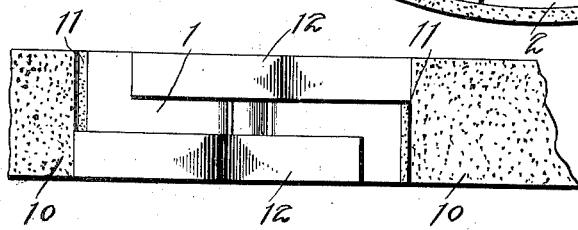
Fig. 3 is a plan view of a portion of the device showing the guide members.
Figure 2:
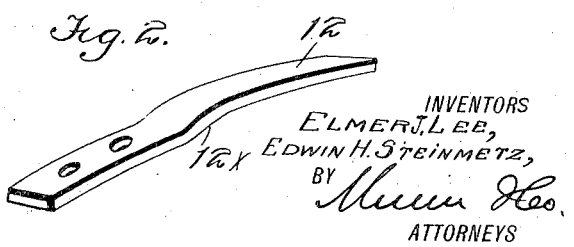
Fig. 2 is a perspective view of one of the guide members.

Secured to the outer surface of the brake band is a lining 10 of any suitable material. This lining terminates at 11, see Fig. 3. Guide members 12 are secured to the body portion 1 of the brake band on opposite edges thereof, as shown in Fig. 3. It will be observed that each of these guide portions has a slight outward bend at 12×.

Without the guide members the turning of the cam 5 in either direction would tend to force one of the ends of the brake band inwardly and the other outwardly, so that the effect would be to grip the brake drum 13 with one end of the band, but to move the other end away from the drum. This would prevent the brake band from exerting its maximum frictional resistance. With the guide members 12, however, the ends of the brake band are caused to expand uniformly since when the cam is turned these guide members slide on the outer sides of the body portion 1 so as to hold both of the ends close to the brake band when the cam is turned to expand the latter.

The purpose of making a bend in the guide members 12× is to prevent the latter from engaging the ends of the body portion 1 with such force as to prevent or retard the free movement of the brake band to its expanded position when the cam is turned. This bend is purposely exaggerated in the drawings, but in actual practice, would be just enough to permit free movement.

The construction set forth insures the positive gripping of the brake drum 13 by the brake band clear out to the ends of the latter, which as stated, expand uniformly when the cam is turned.

We claim:—

1. In a brake band construction, a body portion having ends spaced apart, a cam disposed between the ends for expanding the brake band, and means carried by the end portion of each of said bands and movable relatively to one another for causing the end portion to expand symmetrically.

2. In a brake band construction, a body portion having ends spaced apart, a cam disposed between the ends for expanding the brake band, and means carried by the end portions of the band and disposed in sliding engagement therewith for preventing an inward movement of the ends of the brake band.

3. In a brake, the combination with a brake band having ends spaced apart, a cam disposed between the ends of the brake band for expanding the latter, a guide member carried by each end of the brake band and arranged to engage the opposite end for causing the ends of the brake band to be expanded symmetrically.

4. In a brake, the combination with a brake band having ends spaced apart, a cam disposed between the ends of the brake band for expanding the latter, a guide member carried by each end of the brake band and arranged to engage the opposite end for causing the ends of the brake band to be expanded symmetrically, said guide members being of less width than the brake band and being disposed in parallel relation.

5. In a brake, the combination of a brake band having end portions spaced apart, of a cam arranged to engage said end portion for expanding the brake band, each end portion being provided with a guide member secured thereto and extending into sliding engagement with the opposite end portion, said guide members being of less width than the width of the brake band and being disposed in parallel relation, each of said guide members having a slight bend to permit the free movement of the guide members.

ELMER JESSE LEE.
EDWIN HARRISON STEINMETZ.